United States Patent [19]

Hass

[11] Patent Number: 4,478,811
[45] Date of Patent: Oct. 23, 1984

[54] METHOD FOR PREVENTING SULFUR EMISSIONS FROM VESSELS CONTAINING MOLTEN SULFUR

[75] Inventor: Robert H. Hass, Fullerton, Calif.

[73] Assignee: Union Oil Company of California, Los Angeles, Calif.

[21] Appl. No.: 484,650

[22] Filed: Apr. 13, 1983

[51] Int. Cl.³ .................. C01B 17/02; C01B 17/04
[52] U.S. Cl. .................. 423/574 R; 423/578 R
[58] Field of Search ............ 423/220, 573 G, 578 R, 423/224, 222, 567 R, 574 R, 543, 542, 539, 242 R

[56] References Cited

U.S. PATENT DOCUMENTS 4,314,983 2/1983 Hass et al. .................. 423/224

FOREIGN PATENT DOCUMENTS 1433822 4/1976 United Kingdom ............ 423/578 R

OTHER PUBLICATIONS

"Stop Emissions From Liquid Sulfur", by J. A. Lagas, *Hydrocarbon Processing*, Oct., 1982, pp. 85-89.
"Improving Claus Sulfur Degassing Technology" by Watson et al., NPRA Annual Meeting, Mar. 29-31, 1981.
"The Exxon System for Degassing Liquid Sulfur" published by Exxon Research and Engineering Company, Nov. 1980.

*Primary Examiner*—Earl C. Thomas
*Assistant Examiner*—Jeffrey E. Russel
*Attorney, Agent, or Firm*—Gregory F. Wirzbicki; Dean Sandford

[57] ABSTRACT

Emissions from sulfur pits or other vessels containing molten sulfur are prevented or minimized by use of an air purge drawn into the vessel from the atmosphere and subsequently utilized as a portion of the oxidant required in a process for oxidizing hydrogen sulfide to elemental sulfur.

25 Claims, 3 Drawing Figures

METHOD FOR PREVENTING SULFUR EMISSIONS FROM VESSELS CONTAINING MOLTEN SULFUR

BACKGROUND OF THE INVENTION

The present invention relates to the prevention of emissions of atmospheric pollutants from vessels containing molten elemental sulfur, and most particularly from vessels such as sulfur pits associated with Claus plants and the like.

In Claus plants, hydrogen sulfide is converted by oxidation to elemental sulfur, and the elemental sulfur is often temporarily stored in sulfur pits in molten form. If the sulfur pit is open to the atmosphere, then, as the level of molten sulfur in the sulfur pit falls and rises, air is alternately drawn into the pit and displaced to the atmosphere. Unfortunately, as the air is displaced from the sulfur pit, it carries with it hydrogen sulfide, which is produced not only by release of dissolved hydrogen sulfide from the molten sulfur but also by the decomposition of polyhydrogen sulfides dissolved in the molten sulfur.

The atmospheric discharge of hydrogen sulfide from the sulfur pit is, of course, a source of environmental concern, inasmuch as hydrogen sulfide emissions are usually strictly controlled by governmental regulations. One process aimed at solving this problem is disclosed in "Improving Claus Sulfur Degassing Technology" by E. A. Watson et al., NPRA Annual Meeting, Mar. 29–31, 1981. In this process, a catalyst is employed "with strong catalytic effectiveness for hydrogen polysulfide decomposition." Thus, this process aims at decreasing the hydrogen sulfide emissions by catalytically converting the polyhydrogen sulfides to elemental sulfur.

The present invention, however, is directed to a non-catalytic method for preventing pollution emissions from sulfur pits and other vessels in which molten sulfur is stored.

It is a further object to prevent pollution emissions from sulfur pits and the like without resulting in a mere transfer of the pollution problem to a different location.

It is a further object not only to prevent such pollution emissions but to slightly increase the overall sulfur recovery from a Claus plant or other sulfur-producing process in which sulfur is produced by oxidation of hydrogen sulfide.

It is yet another object to provide a method for preventing such pollution emissions without requiring substantial changes in the operation of the Claus plant or other process producing the elemental sulfur introduced into the sulfur pit or other temporary storage vessel.

It is yet another object to provide a process wherein a purge gas is introduced into the sulfur pit or other vessel without discharge of emissions from a vent associated with the sulfur pit or from leaks in the sulfur pit itself, and to subsequently remove the purge gas from the sulfur pit and convert the sulfur components contained therein to recoverable, elemental sulfur.

These and other objects of the invention will become more readily understood in light of the following description and claims, both taken together with the attached drawing.

SUMMARY OF THE INVENTION

In the present invention, emissions of sulfur-containing gases from sulfur pits or other vessels containing molten sulfur are prevented or substantially reduced by use of an air purge stream, which flows from the atmosphere into the vessel containing the molten sulfur and from there into the oxidant supply of a process, e.g., a Claus process, capable of employing air contaminated with gases and vapors produced in the sulfur pit.

BRIEF DESCRIPTION OF THE DRAWING

In the three figures of the drawing, like elements are indicated by the same reference numerals, although, as will be appreciated, the actual equipment employed in the embodiments depicted in the three figures may vary somewhat.

DETAILED DESCRIPTION OF THE INVENTION

The present invention is directed to any process wherein elemental sulfur is maintained in partially or completely liquid form in a vessel open to the atmosphere and wherein oxygen is required, either for reactions producing the elemental sulfur itself or other reactions wherein the presence of small proportions of hydrogen sulfide, water vapor, elemental sulfur, and/or sulfur dioxide in the supply of oxygen may be tolerated. The present invention is most particularly of use in a process for producing elemental sulfur in a liquid form, especially when the elemental sulfur is produced by a process involving the oxidation of hydrogen sulfide in the gas phase to sulfur vapor in the presence of a solid phase catalyst. Exemplary of such processes is the well-known Claus process, as well as processes such as those disclosed in U.S. Pat. Nos. 4,311,683 and 4,314,983 wherein the catalyst employed to promote the oxidation of hydrogen sulfide to sulfur in the gas phase is a vanadia or vanadium-bismuth catalyst.

Figure 1:
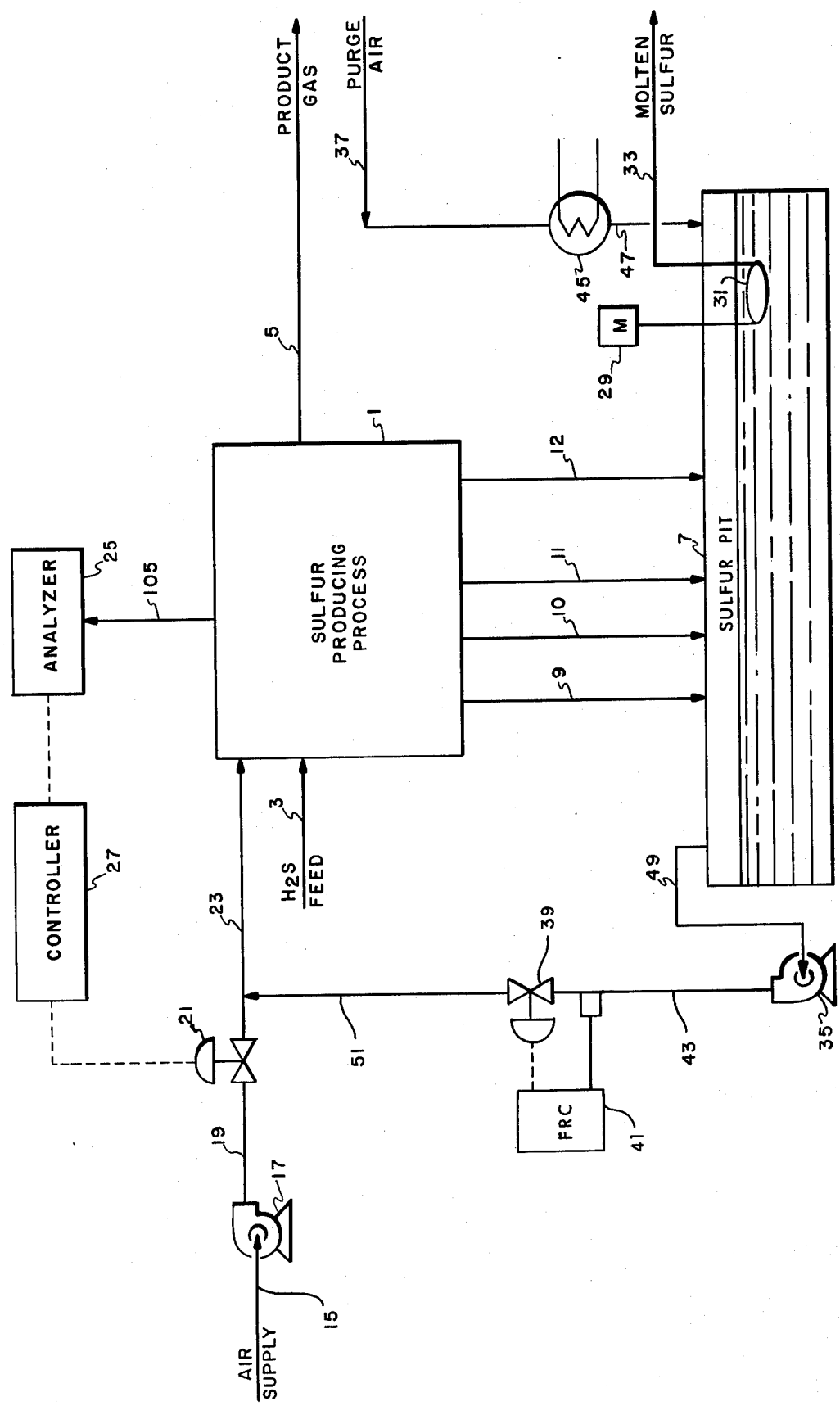
FIG. 1 of the drawing depicts a flowsheet of the method of the invention as applied generally to sulfur-producing processes.

The process of the present invention is perhaps most readily understood by reference to FIG. 1 of the drawing. As shown, a sulfur-producing process 1 is employed to treat a hydrogen sulfide-containing gas stream 3 so as to yield a product gas 5 relatively lean in hydrogen sulfide, and preferably containing as little hydrogen sulfide and other gaseous sulfur components as possible. This is accomplished by oxidation of the hydrogen sulfide to elemental sulfur, which may be recovered, for example, in liquid form by condensation in one or more condensers, followed by passage into sulfur pit 7 via conduits 9, 10, 11, and 12.

The oxidation of the hydrogen sulfide to elemental sulfur in the sulfur-producing process requires, in the usual instance, an air supply 15, from which air is introduced into the process by means of blower 17, conduit 19, control valve 21, and conduit 23. The rate at which air is fed into the sulfur-producing process is regulated by control valve 21 responsive to a controller 27, which is itself responsive to analyzer 25 sampling an appropriate gas stream within the sulfur-producing process. Assuming the sulfur-producing process converts the hydrogen sulfide to sulfur in the gas phase, then a gas stream containing the initial products of reaction between the hydrogen sulfide and oxygen is generally analyzed for the ratio of hydrogen sulfide to sulfur dioxide. The reason for this is that, assuming essentially complete reaction between the hydrogen sulfide and oxygen, two products result, one being the desired elemental sulfur, and the other being sulfur dioxide. The sulfur dioxide will further react with the hydrogen sulfide in additional reaction zones within sulfur-producing process 1 to yield yet more sulfur by:

and since the stoichiometric ratio of hydrogen sulfide to sulfur dioxide for this reaction (known as the Claus reaction) is 2 to 1, analyzer 25 associated with sulfur-producing process 1 typically measures the hydrogen sulfide to sulfur dioxide ratio of a sample of the initial products of reaction taken via sample line 105. To the extent the ratio so measured deviates from the stoichiometric value, to that same extent is a signal sent to controller 27, which in turn sends a signal to control valve 21 to adjust the air rate by partially opening when the ratio is above 2 to 1 and partially closing when the ratio is below 2 to 1.

Returning now to sulfur pit 7, which is normally open to the atmosphere and which contains liquid sulfur at a temperature usually maintained between about 250° and 325° F., the invention provides a method for preventing the discharge to the atmosphere from the sulfur pit of gases emitted from the molten sulfur. These gases typically comprise hydrogen sulfide, sulfur dioxide, elemental sulfur vapor, water, and air in the following concentrations:

| Typical Composition of Sulfur Pit Gases | |
|---|---|
| Component | Concentration |
| $H_2S$, ppmv | 250 to 5,000 |
| $SO_2$, ppmv | 125 to 2,500 |
| $S_x$ where $x = 1$, ppmv[1] | 1,000 to 3,000 |
| $H_2O$, mole percent | 1 to 10 |
| Air | Balance |

[1]A most typical value for the sulfur vapor concentration in sulfur pits is about 1,770 ppmv. The sulfur pit gases may also contain entrained sulfur in liquid or solid form.

It can be seen that if the sulfur pit gases are allowed to discharge through a vent to the atmosphere, for example, by displacement when elemental sulfur fills the pit from conduits 9, 10, 11, and 12 at a rate faster than that at which sump pump 31 driven by motor 29 can remove the sulfur to a tank truck or the like by conduit 33, a problem is encountered with respect to emissions of undesired components to the atmosphere, and most particularly hydrogen sulfide. In accordance with the invention, therefore, a stream of purge air from the atmosphere through sulfur pit 7 to sulfur-producing process 1 is maintained, so as to prevent discharge of sulfur pit gases to the atmosphere. This is accomplished in the invention by means of blower 35 which draws air through sulfur pit 7 and maintains a slight vacuum therein, preferably between about 0.5 and 10.0 inches of water. The purge air is drawn through vent line 37 into heat exchanger 45 wherein the purge air exchanges heat indirectly with a heat exchange medium, with preferred exchange media being steam if readily available or Dowtherm ™ if not. The purge air is thus heated to an elevated temperature, preferably to a temperature at which the sulfur pit itself is maintained, i.e., between about 250° and 325° F., and then passed through conduit 47 to the sulfur pit. After passing the entire length of the sulfur pit, the purge gases, now commingled with gases and vapors emitted from the molten sulfur, are transferred by conduits 49, 43, and 51 and blower 35 to conduit 23 as part of the oxidant supply to the sulfur-producing process. To assure that the purge gas is passed into conduit 23 at an essentially constant rate, e.g., 500 SCF/hr, the preferred embodiment provides a control valve 39 between conduits 43 and 51 to regulate the air flow in response to flow recording controller 41.

To prevent condensation of sulfur vapor and/or deposition of entrained sulfur, and to thereby avoid plugging of the system, it is noted that conduits 49, 43, 51, and 23, as well as blower 35, control valve 39, and the appropriate components of flow recording controller 41, are most preferably steam-jacketed; if steam is not readily available, another heat transfer medium may be used, such as Dowtherm ™. It is further noted that the oxidant supply fed via conduit 23 includes not only oxygen from the air in gas streams carried in conduits 51 and 19, but also the sulfur dioxide carried by conduit 51 from sulfur pit 7. The oxidant supplied through conduit 51 is preferably less than about 5 percent, even more preferably less than about 1 percent, of the total oxidant fed to the sulfur-producing process via conduit 23.

In addition to the advantage offered in the present invention of reducing sulfur emissions, a yet further advantage is that a slight increase in sulfur recovery of the sulfur-producing process is achieved. This is due to the fact that the sulfur pit gases, instead of escaping as pollutants to the atmosphere, are sent to the sulfur-producing process with the purge air and thus recycled to convert the hydrogen sulfide and sulfur dioxide therein to elemental sulfur. (Since the hydrogen sulfide and sulfur dioxide react by the Claus reaction, it will thus be seen that the sulfur dioxide in the purge air stream is an oxidant for converting hydrogen sulfide to elemental sulfur. Hence, the total oxidant fed to the sulfur-producing process via conduit 23 includes not only oxygen in the air from conduits 19 and 51 but also the sulfur dioxide from conduit 51; likewise, the total hydrogen sulfide fed to the process includes not only that from conduit 3 but also that from conduit 51. Under ideal steady state conditions, therefore, when control valve 21 is regulated to supply a stoichiometric air rate, a 2:1 ratio will prevail for the molar feed rate of hydrogen sulfide via conduits 3 and 23 to the sum of the molar feed rates of oxygen and sulfur dioxide via conduit 23.)

Another advantage of the present invention is that emissions to the atmosphere from sulfur pit 7 are not only prevented from escaping through the vent associated with conduit 37 but also through any leaks or other openings to the atmosphere. Provided such leaks or openings are relatively small, it is possible through use of blower 35 to maintain the entire sulfur pit at a negative pressure, i.e., a pressure less than atmospheric, so that gas flow into the pit but not out is assured.

Yet another advantage of the process of the present invention is that no catalyst, such as ammonia, need be added to the sulfur pit. Thus, in this respect, the present invention provides a substantial cost savings over processes requiring continual or intermittent ammonia or other catalyst addition. Further still, the present invention avoids the problem of separating the sulfur product from added catalyst, and a saleable liquid sulfur product is readily obtained from sulfur pit 7 via conduit 33.

Yet another advantage of the present invention is that no complicated equipment of instrumentation is required; the invention only requires relatively modest changes to the usual operation of the Claus plant or other sulfur-producing process. Further, although the air supply to a Claus plant or the like is normally very carefully controlled to the stoichiometric value needed for hydrogen sulfide conversion, it will be seen that the addition via conduit 51 of purge air containing minor concentrations of sulfur components is usually so small by comparison to that fed by conduit 19 that control valve 21 can readily regulate the total oxidant supply to the desired stoichiometric value without resulting in unacceptable or abnormal deviations from usual operation of a Claus plant or other sulfur-producing process.

In the following Examples, the operation of the present invention will be illustrated with respect to two different sulfur-producing processes, one the typical Claus process, and the second a process similar to those described in U.S. Pat. Nos. 4,311,683 and 4,314,983, both of which patents are herein incorporated by reference in their entireties. It should be emphasized, however, that the Examples are provided to illustrate and not to limit the invention; the invention is defined by the appended claims.

EXAMPLE I

Figure 2:
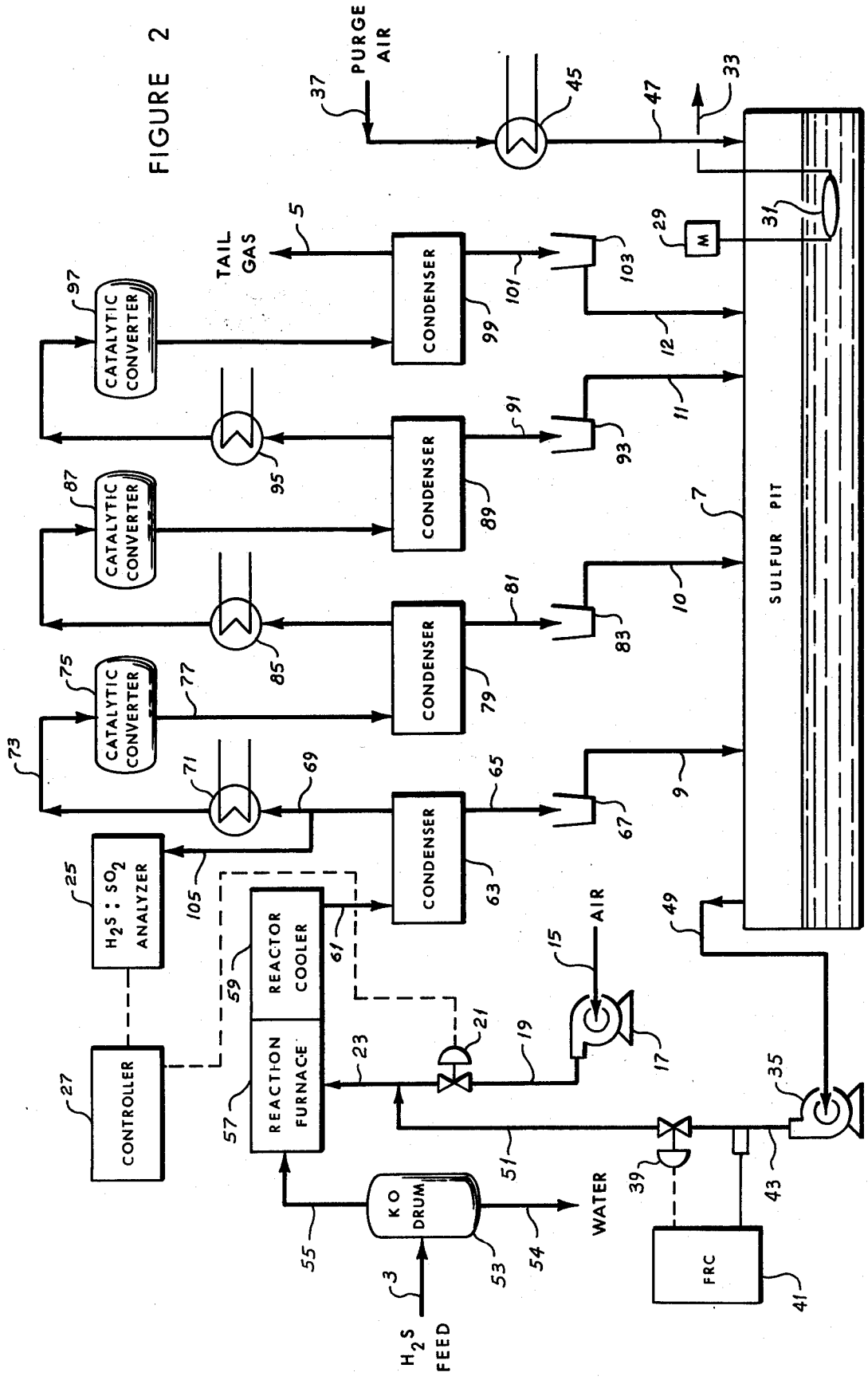
FIG. 2 of the drawing depicts a flowsheet of the preferred method of the invention when the sulfur-producing proces is a Claus unit and the feed stream being treated contains hydrogen sulfide in a concentration of at least about 40 volume percent.

Referring now to FIG. 2 of the drawing, it will be seen that the process of the invention is adaptable for use when the sulfur-producing process is a Claus process. In the Claus process exemplified in FIG. 2, a feed stream containing 92.35 mole percent hydrogen sulfide is introduced through conduit 3 at a feed rate of 53,983 SCF/hr into knock out drum 53 for removal of condensables via conduit 54 and then into reaction furnace 57 after passage through conduit 55. Also introduced into the reaction furnace is an oxidant stream comprising oxygen, fed through conduit 23 at or about the stoichiometric rate required for conversion of the hydrogen sulfide to sulfur, i.e., about 118,699 SCF/hr. Under the combustion conditions maintained in furnace 57, a substantial proportion of the hydrogen sulfide is converted to sulfur, and, after cooling in reactor cooler 59 by exchange with water, the product gases are delivered through conduit 61 to condenser 63. In the condenser, elemental sulfur vapor is condensed to molten sulfur and sent to sulfur pit 7 after passage through conduit 65, seal pot 67 (or other liquid sulfur seal), and conduit 9. The off gases from condenser 63 contain a substantial proportion of unreacted hydrogen sulfide and sulfur dioxide, from which elemental sulfur is recovered in three catalytic stages.

In the first stage, the unreacted gases are passed by conduit 69 to heat exchanger 71 and therein heated to between about 400° and about 600° F., and typically about 439° F. The heated gases are then passed by conduit 73 to catalytic converter 75 wherein the hydrogen sulfide and sulfur dioxide react together in the presence of a catalyst, such as alumina, to produce elemental sulfur vapor. The resulting product gases, containing elemental sulfur vapor as well as reduced concentrations of unreacted hydrogen sulfide and sulfur dioxide, are sent at a temperature of about 568° F. by conduit 77 to condenser 79 wherein, by indirect heat exchange with water, molten sulfur is produced. As with condenser 63, the molten sulfur in condenser 79 is sent to sulfur pit 7 after passage through conduit 81, seal pot 83, and conduit 10.

The second-stage catalytic treatment is similar to the first, with the off gases recovered from condenser 79 first being heated in heater 85 to about 444° F., then contacted with a catalyst in catalytic converter 87 to produce yet more sulfur while further reducing the hydrogen sulfide and sulfur dioxide content, and then delivered at a temperature of about 461° F. to condenser 89. After condensation, elemental sulfur in molten form is sent to sulfur pit 7 via conduit 91, seal pot 93, and conduit 11.

The third stage is similar to the previous two; the residual gases from condenser 89 are heated in heater 95 to about 440° F., contacted in catalytic converter 97 with a catalyst, such as alumina, which is employed to promote the reaction between sulfur dioxide and hydrogen sulfide. A gas containing sulfur vapor is then obtained from catalytic converter 97 at a temperature of about 443° F., and molten sulfur is then obtained as in the previous stages, i.e., by condensation in condenser 99 and passage through conduit 101, seal pot 103, and conduit 12 to sulfur pit 7. Also recovered from condenser 99 is a Claus tail gas 5, which may be treated for yet further removal of sulfur components, as for example by the methods described in U.S. Pat. Nos. 3,752,877, 4,311,683, and 4,314,983.

As a note to the foregoing, it should be pointed out that, although an alumina catalyst is typically employed in each of the catalytic converters, other catalysts, such as a vanadia catalyst or a vanadium-bismuth catalyst may be employed, as well as other catalysts suitable for promoting the conversion of hydrogen sulfide with sulfur dioxide to elemental sulfur. Also, the condensation in each of the condensers is usually achieved with water absorbing sufficient heat during condensation to produce low pressure steam, while the cooling in reactor cooler 59 produces high pressure steam. The steam from one or more of these condensers, or other sources, or combination thereof, may then be used as the heat exchange medium in heat exchangers 71, 85, and 95, as well as in heat exchanger 45 and in the steam jackets surrounding conduits 43, 49, 51, and 23, control valve 39, and blower 35.

In accordance with the invention, a steam-jacketed blower 35 is employed to induce purge air from conduit 37 into and through sulfur pit 7 after being heated in heater 45 to about 260° F. The purge air is passed from sulfur pit 7 via steam-jacketed lines 49, 43, 51, and 23, with the heat provided by the steam-jacketing maintaining the gases passing therethrough at a temperature sufficient to prevent sulfur vapor deposition and consequent plugging. The rate at which the purge air is passed through sulfur pit 7 and into conduit 23 is about 895 SCF/hr, as maintained by steam-jacketed control valve 39 and flow recording controller 41.

Meanwhile, the balance of the air necessary for reactor furnace 57 is fed through control valve 21, which adjusts the amount of total air fed to the furnace in response to controller 27, which in turn is responsive to analyzer 25 directly measuring the $H_2S$ to $SO_2$ ratio in the gas stream leaving condenser 63 and sampled via conduit 105. As the $H_2S$ to $SO_2$ ratio in conduit 105 varies from the desired 2 to 1 ratio, valve 21 opens or closes as necessary to adjust the air rate more closely to the stoichiometric value. Thus, since the feed gas of the present Example contains H₂S in a concentration of 92.35 mole percent and is fed at a rate of about 53,983 SCF/hr, and since the air rate via blower 35 is about 895 SCF/hr, the rate at which air will pass through valve 21 will nominally be about 117,804 SCF/hr, with adjustments slightly therefrom, as explained above, in response to the signals sent from analyzer 25 and controller 27.

The process provides a high recovery of sulfur from hydrogen sulfide with the recovery being slightly improved over operation without the use of the purge air from conduit 37. (Operation without the use of purge air typically yields about a 95 percent recovery, with about 61 percent being recovered by conduit 9, about 25 percent by conduit 10, about 7 percent by conduit 11, and about 2 percent by conduit 12.)

EXAMPLE II

In the foregoing Example, the method of the invention as applied to Claus plants was illustrated. Normally, Claus plants are employed when the feed gas contains at least about 40 volume percent hydrogen sulfide. For gas streams containing lower proportions of hydrogen sulfide, for example, between about 5 and 40 volume percent, it may be more economical to utilize a sulfur-producing process other than the Claus process. One such sulfur-producing process, as modified by the method of the present invention, will not be illustrated with reference to FIG. 3, wherein, for ease of understanding, the same reference numerals are used as in FIGS. 1 and 2 to refer to equipment of similar function.

Figure 3:
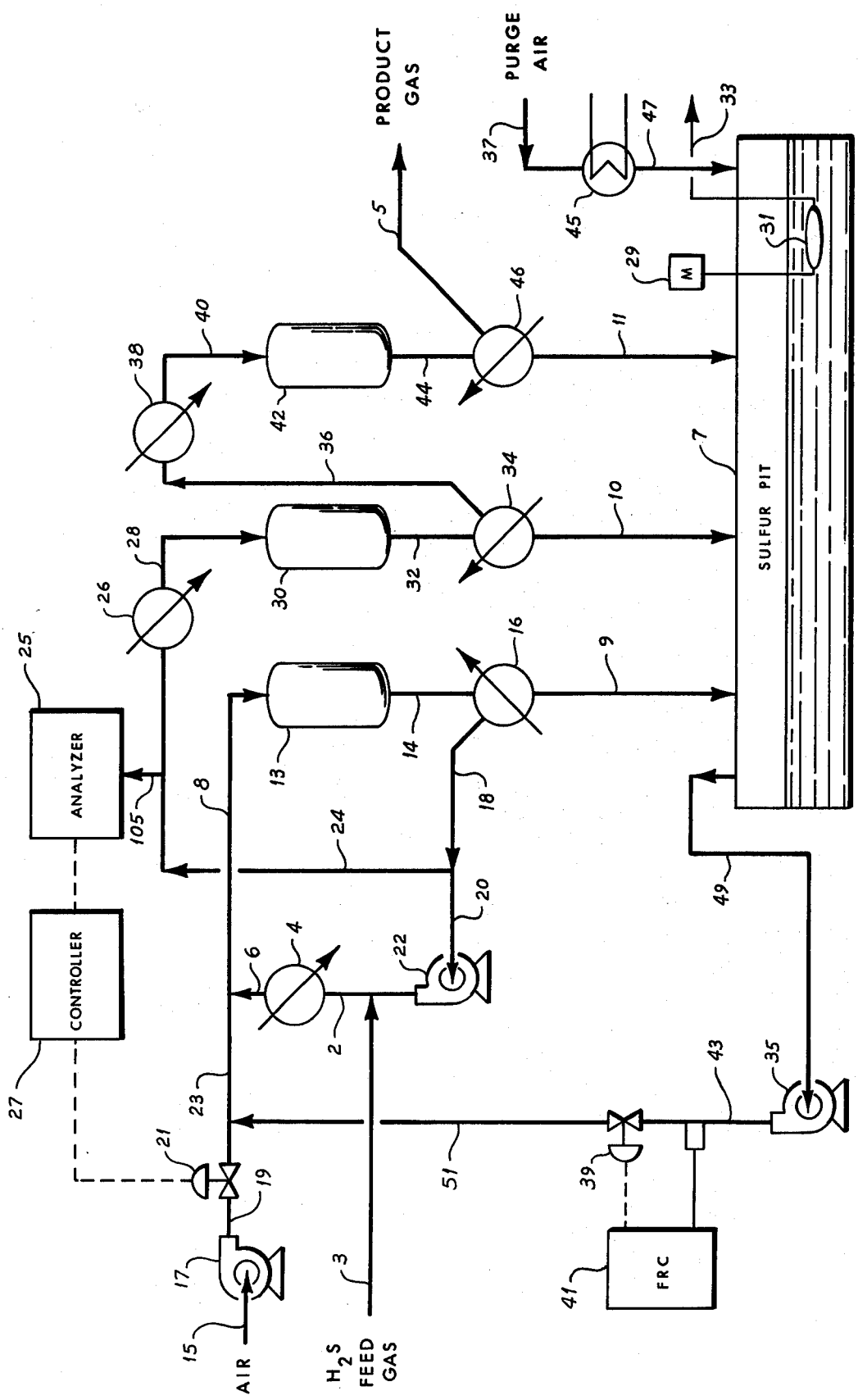
FIG. 3 of the drawing depicts a flowsheet of the preferred method of the invention when the sulfur-producing process is employed to treat a feed gas stream containing from about 5 to about 40 volume percent hydrogen sulfide.

The feed stream contains 16.61 volume percent hydrogen sulfide and is fed as shown in FIG. 3 by conduit 3 to recycle line 2 at a rate of about 83,241 SCF/hr and therein blended with recycle gases circulating at a rate of about 261,120 SCF/hr. The combined gases, flowing at a rate of 344,361 SCF/hr, are passed through heater 4, heated to a temperature of about 383° F., and recovered in conduit 6. The heated gases are then blended with oxidant from conduit 23, and the resultant gases, now at a temperature of about 375° F., are delivered by conduit 8 to catalytic reactor 13 in which is contained a particulate catalyst containing vanadium oxides or sulfides on a porous refractory oxide support or, more preferably, vanadium components and bismuth components on a support comprising silica-alumina, with the alumina being present in the support in a proportion of about 25 percent by weight. Such catalysts are more fully described in U.S. Pat. Nos. 4,311,683 and 4,314,983, respectively, and under the reaction conditions disclosed in said patents, these catalysts are active for oxidizing the hydrogen sulfide with oxygen and/or sulfur dioxide to produce elemental sulfur vapor, presumably by reactions such as:

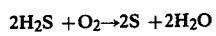

$2H_2S + O_2 \rightarrow 2S + 2H_2O$

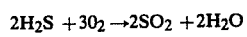

$2H_2S + 3O_2 \rightarrow 2SO_2 + 2H_2O$ $2H_2S + SO_2 \rightarrow 3S + 2H_2O$ The products of reaction from reactor 13 are sent by conduit 14 at a temperature of about 699° F. to condenser 16 wherein sulfur is first condensed at about 358° F. by indirect heat exchange with water and then removed by conduit 9 to sulfur pit 7. The resulting off gases, which contain unreacted hydrogen sulfide and sulfur dioxide, enter conduit 18 and are divided such that a portion is recycled by conduit 20 and blower 22 while the remaining portion flows at a rate of about 107,607 SCF/hr by conduit 24 to heater 26 wherein, by indirect heat exchange with steam, the temperature of the off gases is raised to about 430° F. This heated portion of the off gases is passed by conduit 28 to reactor 30, which contains a catalyst active for promoting the conversion of hydrogen sulfide to sulfur using sulfur dioxide as oxidant. Under reaction conditions, a portion of the unreacted hydrogen sulfide is converted to elemental sulfur vapor in reactor 30, and the resulting gaseous products, at a temperature of about 456° F., are directed to sulfur condenser 34 by conduit 32. In condenser 34, elemental sulfur is liquefied at a temperature of about 286° F. by indirect heat exchange with water, and the liquid sulfur is transported by conduit 10 to sulfur pit 7. Also produced in condenser 34 is a second off gas, which is treated in a fashion analogous to the first, i.e., by passage through conduit 36 to heater 38, and after therein being heated to about 425° F., the second off gas flows through conduit 40 to reactor 42 wherein yet more unreacted hydrogen sulfide reacts with sulfur dioxide in the presence of a catalyst suitable for promoting this reaction, e.g., alumina, or a vanadia catalyst, or a vanadium-bismuth catalyst. The product gases from reactor 42, at a temperature of about 430° F., pass through conduit 44 into sulfur condenser 46 wherein yet more sulfur is liquefied by indirect heat exchange with water, and from condenser 46, which operates at about 268° F., is obtained a product gas and liquid sulfur. The product gas is relatively free of hydrogen sulfide and is discharged or sent to an incinerator via conduit 5; the liquid sulfur, on the other hand, flows to the sulfur pit via conduit 11.

In accordance with the invention, purge air is drawn through conduit 37 at a rate of 253 SCF/hr as regulated ultimately by control valve 39 responding to flow recording controller 41. The purge air is passed into heater 45 and therein heated to about 260° F. The heated purge air subsequently flows through conduit 47, traverses the entire length of sulfur pit 7, and is transported by a steam-jacketed system comprised of blower 35, control valve 39, appropriate components of flow recording controller 41, and conduits 49, 43, 51, and 23. The purge air combines in conduit 23 with the main air from supply 15 introduced into the system by blower 17 and conduit 19 at a rate controlled by control valve 21. In a manner analogous to the previous Example, control valve 21 regulates the air feed in response to signals from controller 27 and analyzer 25, the latter receiving a sample of the gas stream in conduit 24 by sample line 105 and measuring the hydrogen sulfide to sulfur dioxide ratio therein. (Unlike the previous Example, however, the hydrogen sulfide to sulfur dioxide ratio is not measured directly but indirectly, i.e., by measuring the hydrogen sulfide and sulfur dioxide molar concentrations and adjusting valve 21 according to the deviation from zero of the difference between twice the hydrogen sulfide value and one times the sulfur dioxide value.) Under steady state conditions, the stoichiometric flow rate of air through control valve 21 is nominally about 32,667 SCF/hr.

By the method of the invention, essentially no noxious gases are emitted from the sulfur pit 7 to the atmosphere. Also, the process provides for a high recovery of sulfur from hydrogen sulfide, with the recovery being slightly improved over operation without the use of purge air provided by the invention. (Operation without use of purge air typically yields about a 97.2 percent recovery overall, with about 74.9 percent of the hydrogen sulfide being recovered as sulfur in conduit 9, about 20.4 percent in conduit 10, and about 1.9 percent in conduit 11.)

Although the invention has been described by reference to preferred embodiments thereof, it is apparent that the invention is capable of many modifications, alternatives, and variations. For example, in one embodiment of the invention, particularly of use when sulfur pit 7 is essentially sealed to prevent leaks to or from the atmosphere, control valve 39 and flow recording controller 41 may be installed on conduit 37 upstream of heat exchanger 45. In this embodiment, a constant flow of air is ensured without the necessity for steam-jacketing control valve 39 or taking precautions with respect to the instrumentation associated with flow recording controller 41 to prevent erroneous readings due to sulfur condensation.

In yet another embodiment, blower 35 may be located upstream of heater 45 so that purge air passes through the sulfur pit under a positive pressure. As with the previous embodiment, the use of a tightly sealed sulfur pit is important; otherwise, the blower will simply force sulfur-containing gases from the sulfur pit into the atmosphere via the openings offered by the leaks.

In yet another embodiment, the operation described in Example II is modified to exclude recycle line 2 and associated equipment necessary thereto and to provide for direct introduction of the feed gas via conduit 3 into reactor 13. This embodiment is particularly useful when the gas stream being treated via conduit 3 contains hydrogen sulfide in concentrations no greater than about 5 volume percent.

In yet a further embodiment, the temperature of the equipment utilized to pass the purge air from the sulfur pit to the sulfur-producing process may be maintained above the sulfur condensation point by blending into conduit 49 a relatively hot gas stream. In so doing, the heat energy required to be transferred to such equipment via the steam-jacketing may be substantially reduced in direct relationship to the amount of heat introduced into the system by the hot gas stream.

Thus, it is apparent that the present invention is capable of many modifications, and it is intended to embrace within the invention all modifications, embodiments, variations, and alternatives as fall within the spirit and scope of the appended claims.

I claim:

1. A method for reducing emissions of sulfur-containing gases from a vessel containing molten elemental sulfur, said molten sulfur having been produced in a process wherein hydrogen sulfide reacts with an oxidant in one or more oxidation reaction zones, said method comprising (a) introducing a purge air stream into said vessel while the vessel is open to the atmosphere but under a subatmospheric pressure, (b) removing said purge air stream from said vessel, said removed purge air stream consisting essentially of air and components from said vessel and said components including at least one sulfur-containing component and (c) while maintaining the removed purge air stream at an elevated temperature preventing substantial formation of solid elemental sulfur, flowing the removed purge air stream into at least one of said oxidation reaction zones, with the removed purge air stream forming a portion of the oxidant required for reaction with the hydrogen sulfide to produce elemental sulfur.

2. A method as defined in claim 1 wherein the removed purge air stream is controlled to flow at an essentially constant rate.

3. A method as defined in claim 1 wherein said purge air stream removed from said vessel is maintained at said elevated temperature at least in part by indirect heat exchange.

4. A method as defined in claim 1 wherein said purge air stream removed from said vessel is maintained at said elevated temperature substantially completely by indirect heat exchange with steam.

5. A method as defined in claim 1 wherein the introduced purge air stream enters said vessel above the level of molten sulfur in said vessel and the removed purge air exits at a location above the level of molten sulfur.

6. A method as defined in claim 1 wherein, in at least one of said oxidation reaction zones, said hydrogen sulfide reacts with a gaseous oxidant in the gas phase in the presence of a solid phase catalyst.

7. A method as defined in claim 6 wherein said solid phase catalyst comprises vanadium oxides or sulfides on a refractory oxide support.

8. A method as defined in claim 6 wherein said solid phase catalyst comprises vanadium components on a refractory oxide support.

9. A method as defined in claim 6 wherein said solid phase catalyst comprises vanadium and bismuth components on a refractory oxide support.

10. A method as defined in claim 6 wherein the introduced purge air stream is heated prior to entry into said vessel.

11. A method as defined in claim 6 wherein the removed purge air stream combines with another oxidant prior to entry into any of said one or more reaction zones.

12. A method as defined in claim 11 wherein the removed purge air stream comprises no more than about 1 percent of the total oxidant required in said process wherein hydrogen sulfide reacts with said oxidant.

13. A method as defined in claim 12 wherein said total oxidant is controlled to provide essentially the stoichiometric amount necessary for conversion of said hydrogen sulfide to elemental sulfur.

14. A method as defined in claim 6 wherein no catalyst is admixed with said molten sulfur in said vessel.

15. A method as defined in claim 6 wherein said purge air stream removed from said vessel comprises hydrogen sulfide, elemental sulfur vapor, water vapor, and sulfur dioxide.

16. A method as defined in claim 15 wherein said purge air stream removed from said vessel further contains entrained sulfur in liquid or solid form.

17. A method as defined in claim 1 wherein said purge air stream removed from said vessel contains entrained sulfur in liquid or solid form.

18. A process for oxidizing hydrogen sulfide to elemental sulfur comprising:
   (1) blending a feed gas comprising hydrogen sulfide with an oxidant gas comprising oxygen;
   (2) combusting the hydrogen sulfide in the blended gas stream to produce elemental sulfur vapor, and recovering a substantial proportion of said elemental sulfur by condensation, leaving unreacted hydrogen sulfide and produced sulfur dioxide;
   (3) reacting a substantial proportion of said unreacted hydrogen sulfide and said produced sulfur dioxide to elemental sulfur in one or more reaction zones wherein a catalyst is present to promote the reaction to elemental sulfur;

(4) collecting sulfur produced in steps (2) and (3) in a storage vessel open to the atmosphere but under a subatmospheric pressure;
(5) drawing a purge air stream through said storage vessel;
(6) removing from said vessel said purge air stream, said removed purge air stream consisting essentially of air and components from said vessel and said components including at least one sulfur-containing component; and
(7) blending said removed purge air stream in with the feed gas and oxidant gas of step (1), said removed purge air stream being maintained at an elevated temperature sufficient to prevent formation of solid sulfur from the time the purge air is removed from said storage vessel to said blending in step (1).

19. A process as defined in claim 18 wherein said blending in step (1) is such that essentially the stoichiometric amount of oxidant is available in said blended gas stream of step (2) for conversion of the hydrogen sulfide therein to elemental sulfur, and wherein said purge air stream is heated prior to entering said storage vessel, and wherein said removed purge air stream is introduced into step (1) at an essentially constant rate.

20. A process as defined in claim 19 wherein said blended gas stream is maintained at an elevated temperature sufficient to prevent formation of solid sulfur prior to said combusting in step (2).

21. A process for oxidizing hydrogen sulfide to elemental sulfur comprising:
(1) blending a feed gas comprising hydrogen sulfide with air;
(2) reacting in the gas phase said hydrogen sulfide with the oxygen present in said air to elemental sulfur in the presence of a solid phase catalyst for promoting the reaction of hydrogen sulfide and oxygen to elemental sulfur, said reacting also resulting in unreacted hydrogen sulfide and produced sulfur dioxide;
(3) reacting a substantial proportion of said unreacted hydrogen sulfide and produced sulfur dioxide to elemental sulfur in one or more reaction zones wherein a catalyst is present to promote the conversion of hydrogen sulfide with sulfur dioxide to elemental sulfur;
(4) recovering elemental sulfur from steps (2) and (3) and collecting said elemental sulfur in a storage vessel open to the atmosphere but under a subatmospheric pressure;
(5) drawing a purge air stream through said storage vessel;
(6) removing said purge air stream from said storage vessel, said removed purge air stream consisting essentially of air and components from said vessel and said components including at least one sulfur-containing component; and
(7) blending said removed purge air stream with the feed gas and air of step (1), said removed purge air stream being maintained at an elevated temperature sufficient to prevent formation of solid sulfur from the time the purge air is removed from said storage vessel to said blending in step (1).

22. A method as defined in claim 5 wherein no catalyst is admixed with said molten sulfur in said vessel.

23. A method as defined in claim 22 wherein the removed purge air stream is controlled to flow at an essentially constant rate.

24. A method as defined in claim 23 wherein the removed purge air stream comprises no more than about 1 percent of the total oxidant required in said process wherein hydrogen sulfide reacts with said oxidant.

25. A method as defined in claim 24 wherein the removed purge air stream combines with another oxidant prior to entry into any of said one or more reaction zones.

* * * * *